US011889558B2

United States Patent
Khoryaev et al.

(10) Patent No.: US 11,889,558 B2
(45) Date of Patent: *Jan. 30, 2024

(54) INTRA- AND INTER-RAT CO-EXISTENCE AND CONGESTION CONTROL FOR LTE PC5-BASED VEHICLE-TO-VEHICLE (V2V) COMMUNICATION

(71) Applicant: Apple Inc., Cupertino, CA (US)

(72) Inventors: Alexey Khoryaev, Nizhny Novgorod (RU); Mikhail Shilov, Nizhny Novgorod (RU); Andrey Chervyakov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,488

(22) Filed: Feb. 23, 2023

(65) Prior Publication Data

US 2023/0199849 A1 Jun. 22, 2023

Related U.S. Application Data

(63) Continuation of application No. 17/032,324, filed on Sep. 25, 2020, now Pat. No. 11,595,995, which is a (Continued)

(51) Int. Cl.
*H04W 74/08* (2009.01)
*H04W 72/02* (2009.01)
*H04W 72/541* (2023.01)
*H04B 17/318* (2015.01)
(Continued)

(52) U.S. Cl.
CPC ...... *H04W 74/0816* (2013.01); *H04B 17/318* (2015.01); *H04W 4/46* (2018.02);
(Continued)

(58) Field of Classification Search
CPC .............. H04W 74/0816; H04W 4/46; H04W 28/0284; H04W 72/02; H04W 72/082;
(Continued)

(56) References Cited

U.S. PATENT DOCUMENTS

2015/0085767 A1* 3/2015 Einhaus ................. H04L 5/003 370/329
2015/0223217 A1* 8/2015 Chen ..................... H04W 72/00 370/329
(Continued)

OTHER PUBLICATIONS

Ericsson (Indicated by IDS filed on Jan. 31, 2019, R1-166955 "Congestion control framework for V2V") (Year: 2016).*
(Continued)

*Primary Examiner* — Hardikkumar D Patel
(74) *Attorney, Agent, or Firm* — Kowert, Hood, Munyon, Rankin & Goetzel, P.C.

(57) ABSTRACT

Systems and methods of providing RAT co-existence and congestion control in V2V communications are generally described. A vUE detects specific non-LTE RAT transmissions in a listening period of a PSSCH or PSSCH, determines whether a metric has been met and reselects to a non-overloaded channel to communicate with other vUEs or the eNB. The manner of reselection is dependent on the RAT specific or V2X service priorities of the channels, as well as whether the channels are V2V service dependent.

20 Claims, 10 Drawing Sheets

Related U.S. Application Data continuation of application No. 16/322,412, filed as application No. PCT/US2017/053652 on Sep. 27, 2017, now Pat. No. 10,820,348.

(60) Provisional application No. 62/402,507, filed on Sep. 30, 2016.

(51) Int. Cl.
*H04W 4/46* (2018.01)
*H04W 28/02* (2009.01)
*H04W 76/14* (2018.01)

(52) U.S. Cl.
CPC ....... *H04W 28/0284* (2013.01); *H04W 72/02* (2013.01); *H04W 72/541* (2023.01); *H04W 76/14* (2018.02)

(58) Field of Classification Search
CPC ... H04W 76/14; H04W 28/085; H04W 24/08; H04W 48/18; H04W 4/44; H04W 88/06; H04W 92/18; H04B 17/318; H04B 17/382; H04L 47/11; H04L 47/12
See application file for complete search history.

(56) References Cited

U.S. PATENT DOCUMENTS

| | | |
|---|---|---|
| 2016/0277992 A1 | 9/2016 | Cao |
| 2017/0207885 A1* | 7/2017 | Lee ................... H04W 72/1215 |
| 2017/0230937 A1* | 8/2017 | Nguyen ................ H04W 88/06 |
| 2018/0115970 A1* | 4/2018 | Chae ..................... H04W 4/026 |
| 2018/0124707 A1* | 5/2018 | Lee ......................... H04W 4/80 |
| 2018/0206282 A1* | 7/2018 | Singh .................... H04W 76/15 |
| 2018/0227155 A1* | 8/2018 | Khoryaev ............. H04W 72/04 |
| 2019/0116586 A1* | 4/2019 | Basu Mallick ....... H04W 64/00 |

OTHER PUBLICATIONS

"Co-channel coexistence for DSRC and LTE- V2V", Qualcomm Incorporated, R1-166268, 3GPP TSG-RAN WG1 #86, Gothenburg, Sweden, (Aug. 13, 2016).

"Considerations on the co-channel coexistence of L TE PCS V2V and IEEE 802.11 p", LG Electronics, R1-166839, 3GPP TSG RAN WG1 Meeting #86, Gothenburg, Sweden, (Aug. 13, 2016).

"International Application Serial No. PCT/US2017/053652, International Search Report dated Dec. 15, 2017", 3 pgs.

"Metric and side link measurements for V2V congestion control", Intel Corporation, R1-166514, 3GPP TSG RAN WG1 Meeting #86, Gothenburg, Sweden, (Aug. 13, 2016).

Ericsson, "Congestion Control Framework forV2V", R1-166955, 3GPP TSG RAN WG1 Meeting #86, Gothenburg, Sweden, (Aug. 12, 2016).

Qualcomm Incorporated, 'Co-channel coexistence for DSRC and L TE- V2V', RI-166268, 3GPP TSG-RAN WG1 #86, Gothenburg, Sweden, Aug. 13, 2016 (Year: 2016).

* cited by examiner ial

INTRA- AND INTER-RAT CO-EXISTENCE AND CONGESTION CONTROL FOR LTE PC5-BASED VEHICLE-TO-VEHICLE (V2V) COMMUNICATION

PRIORITY CLAIM

This application is a continuation of U.S. patent application Ser. No. 17/032,324, filed Sep. 25, 2020, entitled "INTRA-AND INTER-RAT CO-EXISTENCE AND CONGESTION CONTROL FOR LTE PC5-BASED VEHICLE-TO-VEHICLE (V2V), which is a continuation of U.S. patent application Ser. No. 16/322,412, filed Jan. 31, 2019, entitled "INTRA- AND INTER-RAT CO-EXISTENCE AND CONGESTION CONTROL FOR LTE PC5-BASED VEHICLE-TO-VEHICLE (V2V) 10 COMMUNICATION", now U.S. Pat. No. 10,820,348, which is a U.S. National Stage Filing under 35 U.S.C. 371 from International Application No. PCT/US2017/053652, filed Sep. 27, 2017, which claims the benefit of priority to U.S. Provisional Patent Application No. 62/402,507, filed Sep. 30, 2016, entitled "INTRA- AND INTER-RAT CO-EXISTENCE AND CONGESTION CONTROL FOR LTE PC5-BASED VEHICLE-TO-VEHICLE (V2V) 10 COMMUNICATION," which are incorporated herein by reference in stheir entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks. Some embodiments relate to various cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to vehicle-to-vehicle (V2V) communications or vehicle-to-anything (V2X) communications.

BACKGROUND

The use of 3GPP LTE systems (including both LTE and LTE-A systems) has increased due to both an increase in the types of devices user equipment (UEs) using network resources as well as the amount of data and bandwidth being used by various applications, such as video streaming, operating on these UEs. For example, the growth of network use by Internet of Things (IoT) UEs, which include machine type communication (MTC) devices such as sensors and may use machine-to-machine (M2M) communications, has severely strained network resources. New 3GPP standard releases related to the next generation network (5G) are taking into account the massive influx of low-data, high-delay and low power transmissions.

One type of increasingly popular communication type is vehicle-to-anything (V2X) communications, and in particular vehicle-to-vehicle (V2V) communications. Despite increased interest in this type of communications, development and standardization of V2V communications remains pending.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other to changes. Portions and features of some embodiments may be included in, or substituted for, those of other embodiments. Embodiments set forth in the claims encompass all available equivalents of those claims.

Figure 1:
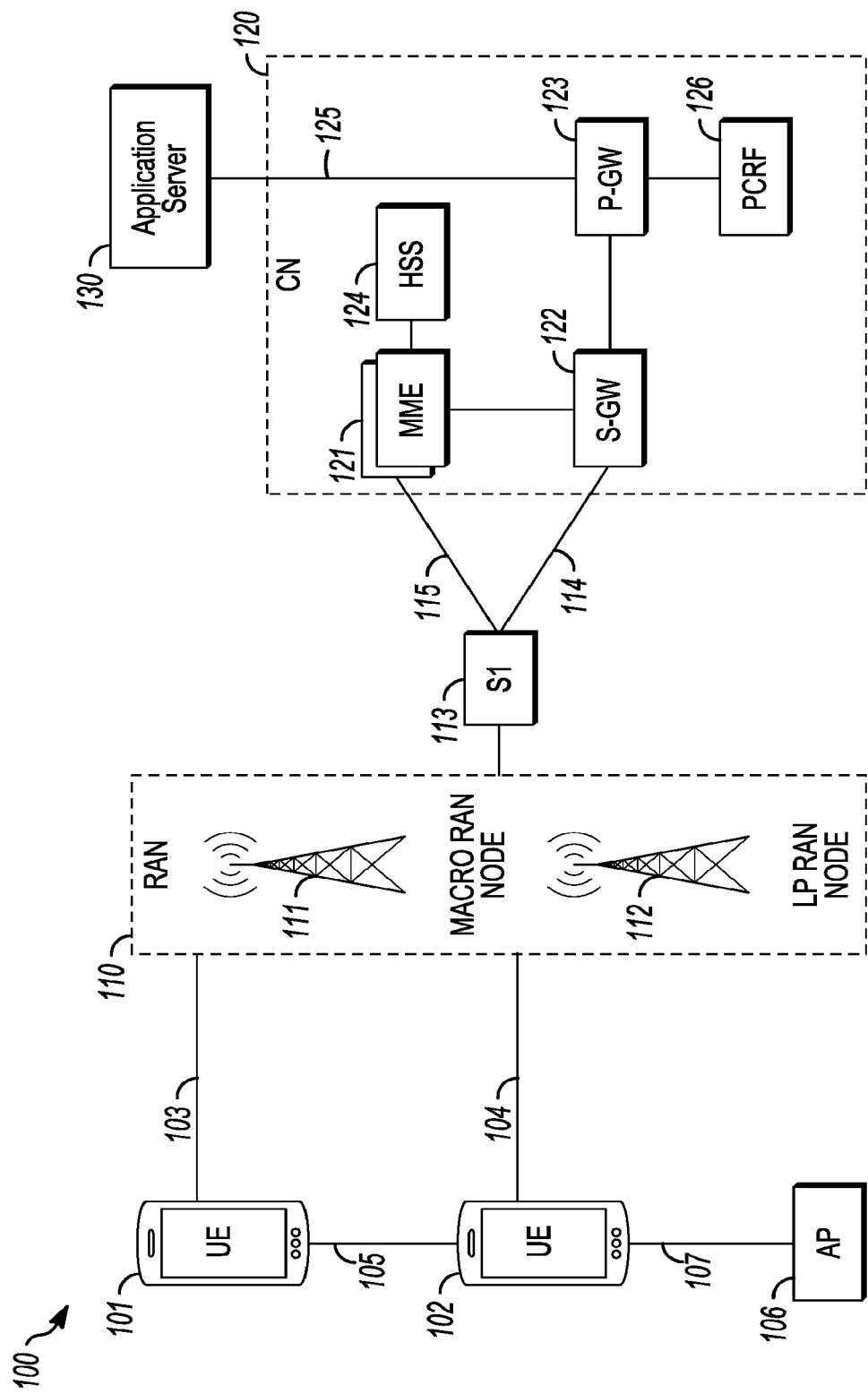
FIG. 1 illustrates an architecture of a system of a network in accordance with some embodiments.

FIG. 1 illustrates an architecture of a system 100 of a network in accordance with sonic embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gigabit NodeBs—gNBs), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air to interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may can user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more to enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
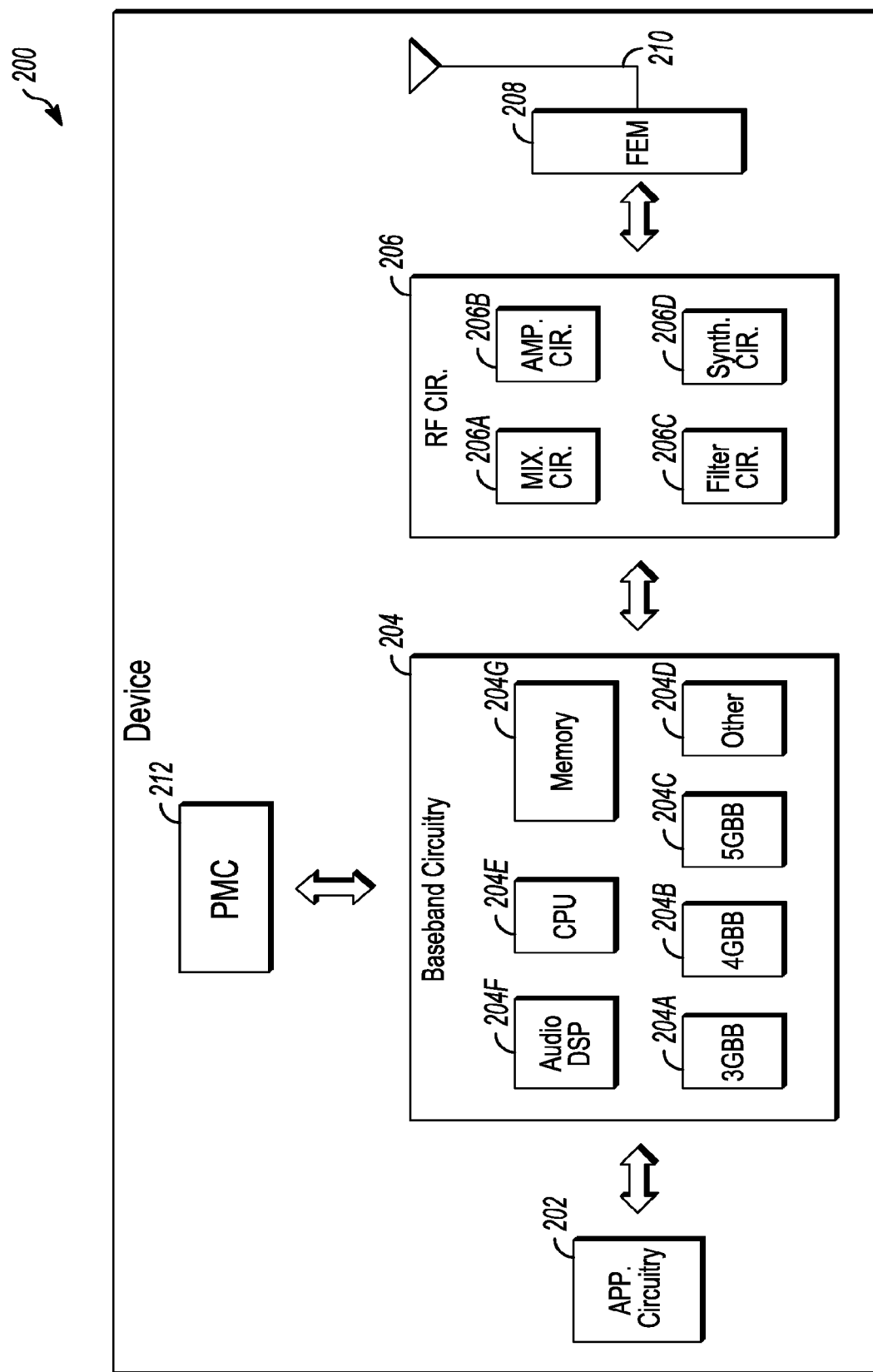
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a 5G baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), preceding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support to communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In sonic embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The REM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition to an RRC_Idle state. In the RRC_Idle state, the device 200 may disconnect from the network and avoid performing operations such as channel quality feedback, handover, etc. The device 200 may enter a very low power state and perform paging in which the device 200 may periodically wake up to listen to the network and then power down again. To receive data, the device 200 may transition back to the RRC_Conncted state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 to functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
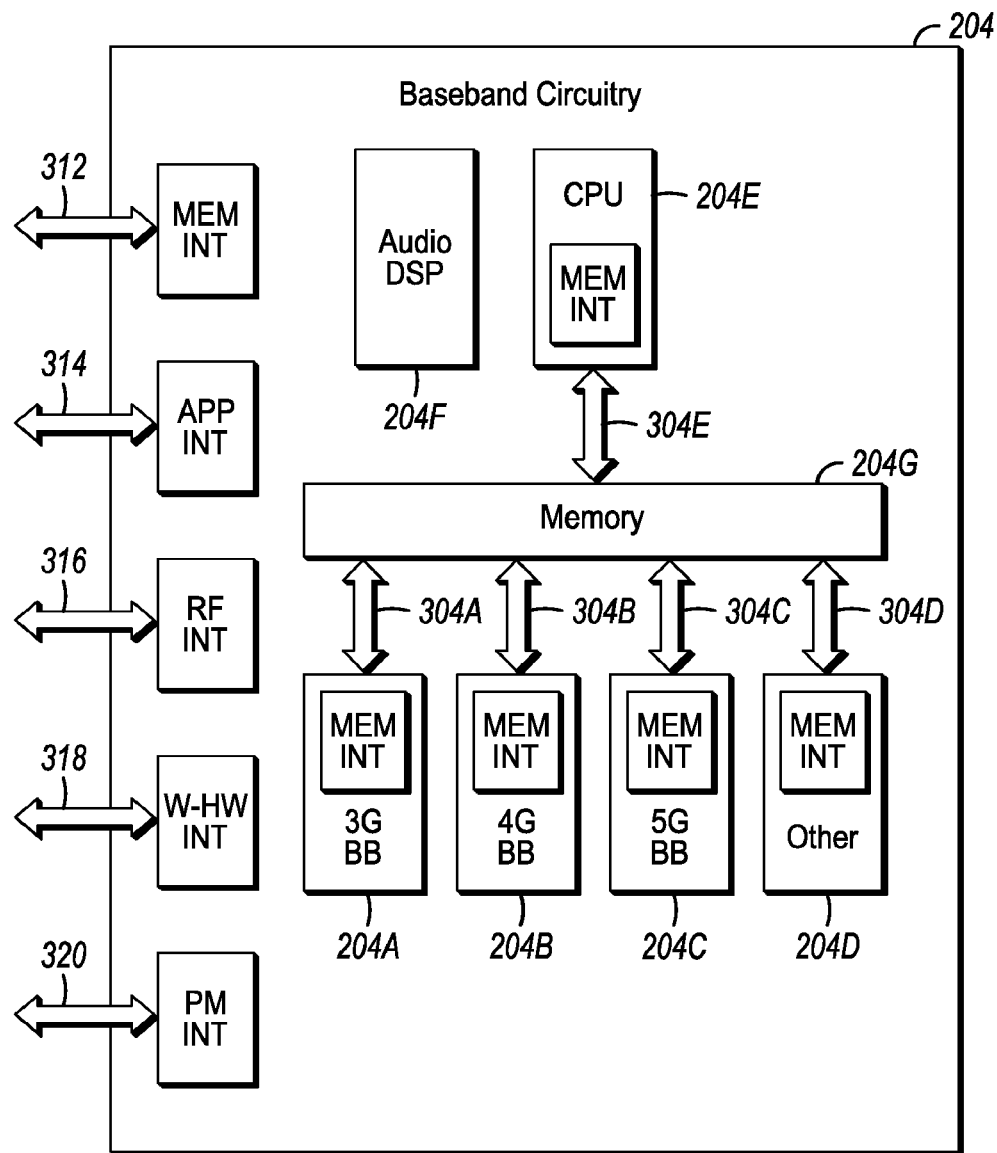
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-XT04E and a memory 204G utilized by said processors. Each of the processors 204A-XT04E may include a memory interface, 304A-XU04E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
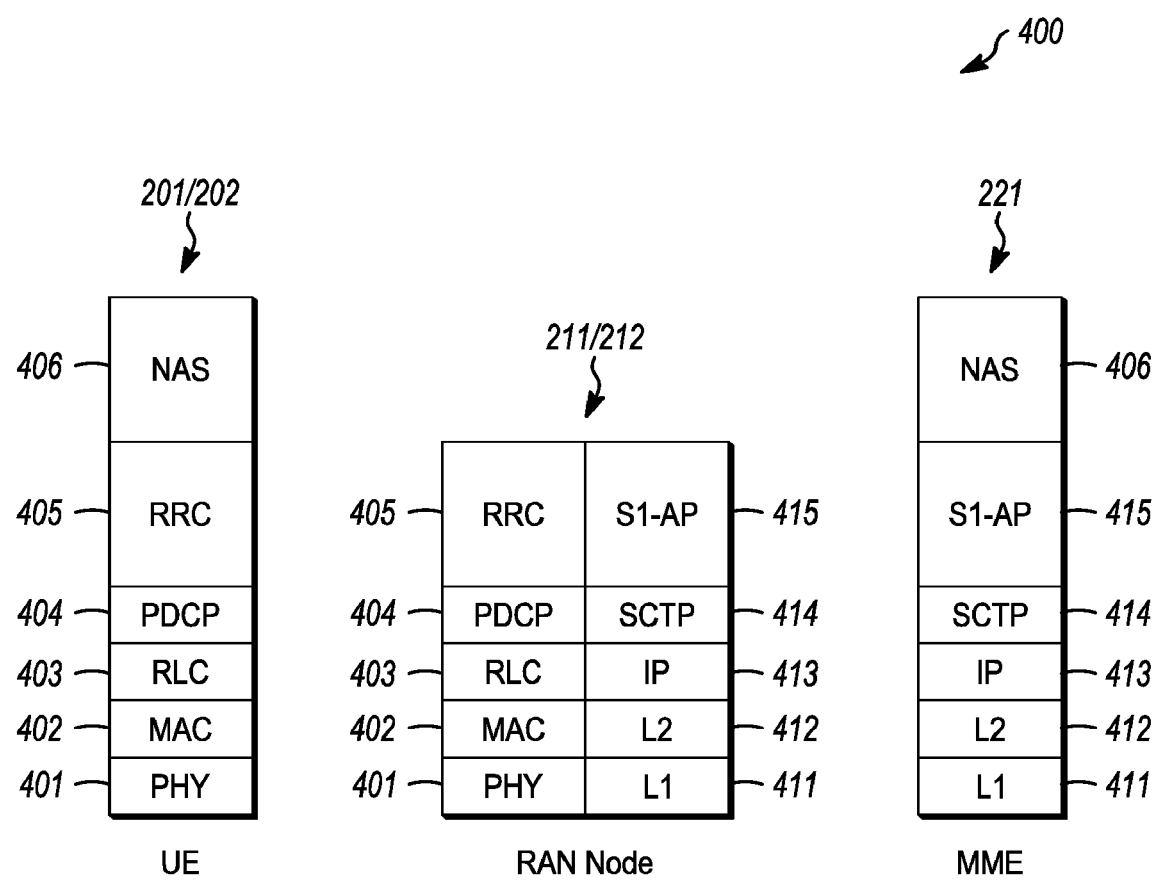
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data. and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
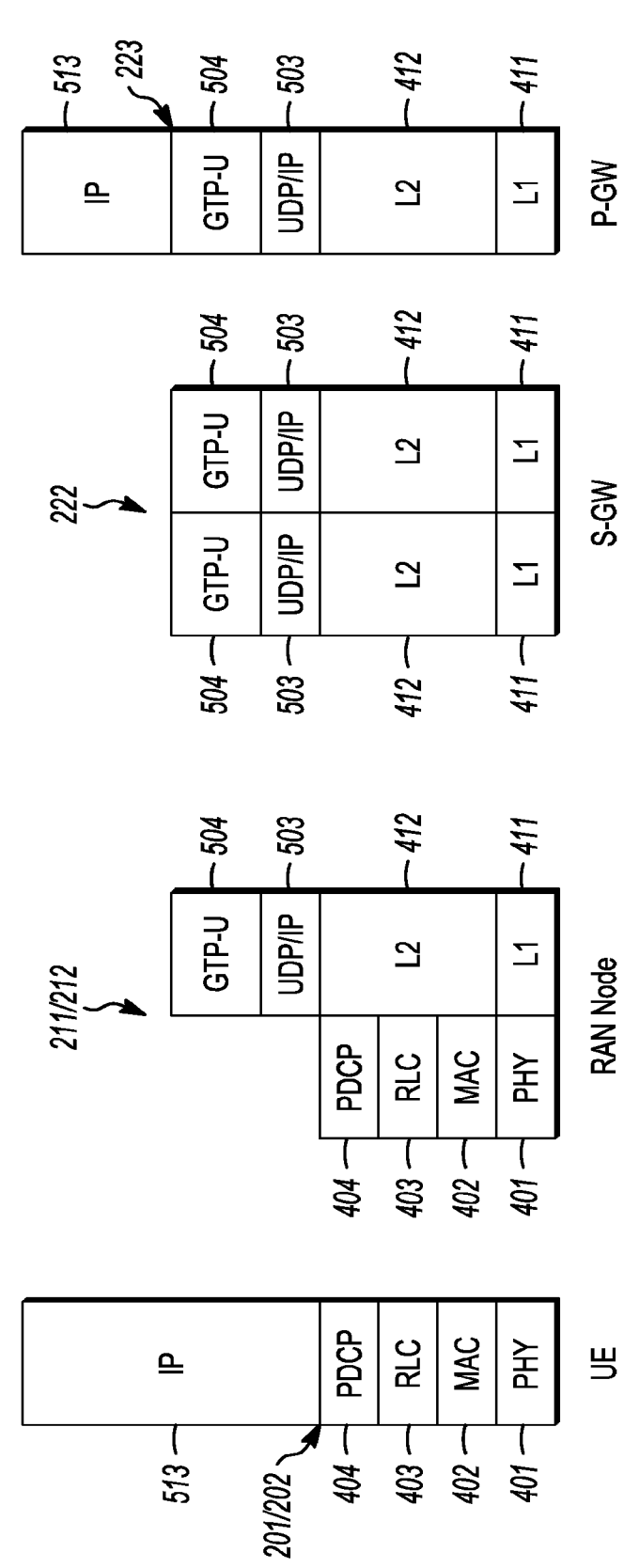
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GWP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the to selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
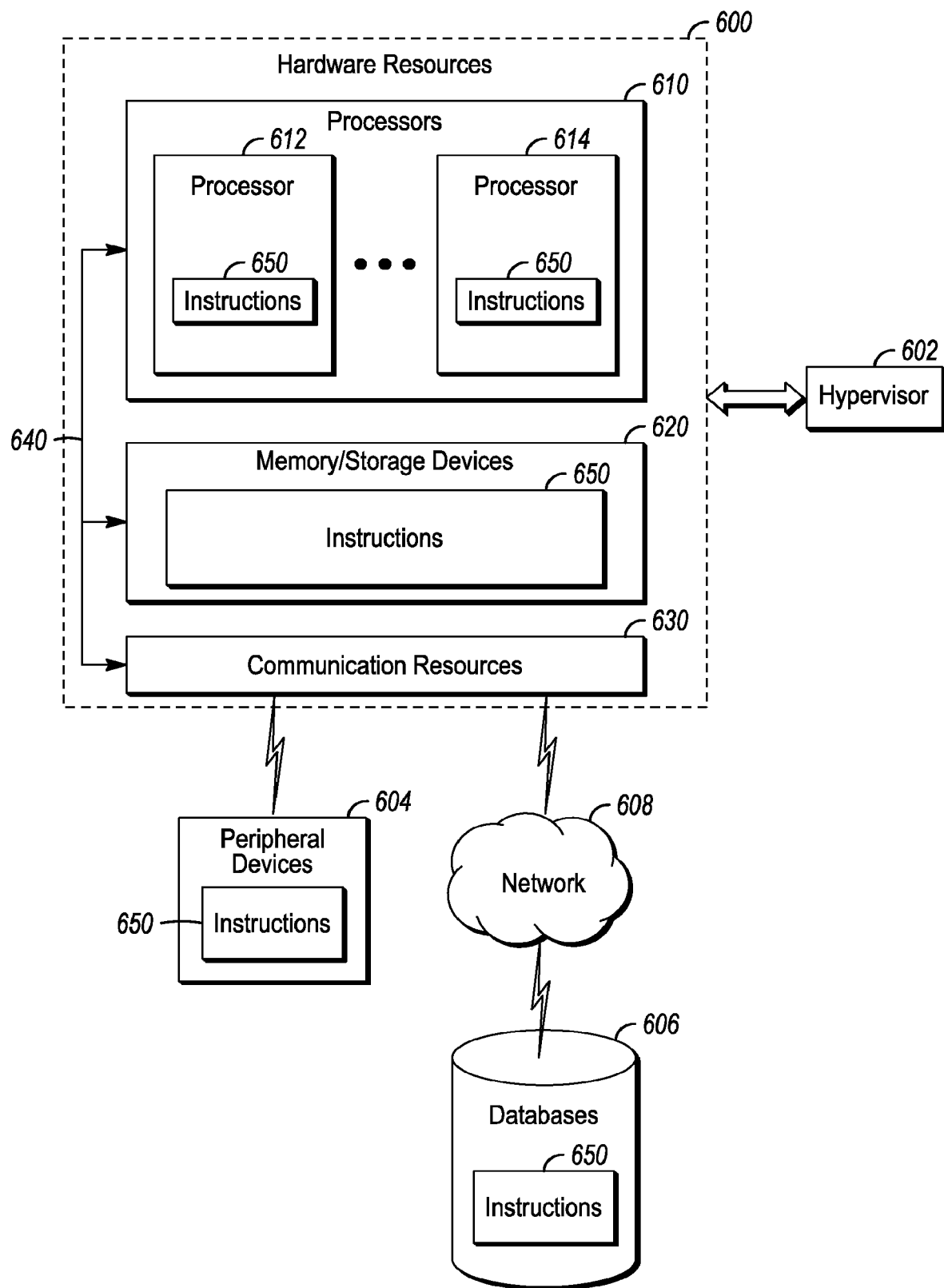
FIG. 6 is a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. In some embodiments, the instructions 650 may reside on a tangible, non-volatile communication device readable medium, which may include a single medium or multiple media. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

As described above, with the advent of smart cars and other advanced vehicles, V2V communications have become a rapidly increasing area of interest. LTE-based V2V communication technology is being developed to provide vehicular Intelligent Transport System (ITS) services to V2V devices (or V2X devices). The ITS services may include road safety services, which may be among the ITS technology candidates for deployment. Several ITS technologies may be allowed for deployment in the same set of frequency channels allocated for ITS services. The ITS services may be supplied to a vUE via Vehicle-to-Vehicle (V2V), Vehicle-to-Infrastructure (V2I), Vehicle-to-Network (V2N) or Vehicle-to-Pedestrian (V2P) communications over a PC5 reference point. V2I communications may involve communications with a Road Side Unit (RSU) and V2N communications may involve communications with an eNB. In order to provide co-channel coexistence of LTE V2V Radio Access Technology (RAT) and other legacy (e.g., Wi-Fi 802.11p-based Dedicated Short Range Communication (DSRC)) or future ITS technologies (e.g., 5G or New Radio (NR)), it may be desirable to provide the communication device with the ability to detect the presence of a RAT at a specific selected frequency (channel), which, if present, may trigger a frequency channel reselection process. A frequency channel selection and switching procedure may further be provided to minimize the impact of the RATs on one another.

Switching may be used dependent on the load of various channels. Thus, the metrics to measure channel loading may be defined. By defining the channel loading measurement metrics and establishing a frequency channel selection procedure, the communication devices (hereinafter referred to as vehicle UEs or vUEs) may be able to take congestion measurements and use the measurements to establish congestion control in the LTE V2V system. In addition, RAT detection and congestion control measurement, in addition to a long-term frequency channel selection and switching procedure may enable RAT co-existence and congestion control. Note that vUEs may be located within vehicles or may be located in other environments (e.g., cell phones).

Various technologies may be used to provide LTE V2V long-term RAT co-channel coexistence both with already developed technologies (e.g. IEEE 802.11p/DSRC) and future ITS technologies (e.g. 5G New RAT V2V technologies). These technologies may include the use of a listening interval and a specific LTE V2V signal, as well as a mechanism to select or switch the channel to provide co-existence with other RATs. In particular, in some embodiments a listening interval used for RAT transmission detection may be introduced. The listening interval may occur in the unoccupied last symbol in a V2V subframe. Alternatively, or in addition, the listening interval may occur in a separate, predefined set of subframes. A new LTE V2V signal may be used during the listening interval to detect the LTE V2V transmitters that are in operation at the same frequency channel. The listening interval may be specific to RAT detection and occur at a different time from detection of reference signals such as CSI-RS or zero-power (ZP) tracing (or other) reference signals (ZP-TRS).

RAT co-existence may be obtained using one of a number of different approaches. In some embodiments, geo-location and one or more geographic databases may be used as different regions may mandate or allow (or place restrictions on) the use of different technologies. The use of different databases may permit different technologies to be used in different geographical regions. The different geographical regions may in some embodiments overlap. A vUE may be able to use this approach based on geo-location information of the vUE, in addition to being permitted to dependent on information from database that can be pre-installed in vehicle in which the vUE is located or provided to the vUE by the network. This may be implemented based on the decision of an ITS service provider using upper layer communication with the vUE.

Another embodiment for providing RAT co-existence in the system, involves time sharing between systems based on the global navigation satellite system (GNSS). This may be used for LTE V2V coexistence solutions with other technologies supporting GNSS. If the vUE has stable GNSS timing, the vUE may be able to continually (e.g., always) apply the time sharing approach with other technologies in the same frequency channel. The use of a common timing scheme may permit the different RATs to know the resources used by other RATs. As a fallback technology, if the vUE is unable to obtain accurate GNSS timing (either direct or derived), the LTE V2V may switch to frequency channel where LTE-V2V is supposed to operate according to the LTE V2V synchronization procedures. If third-party technology is mandated to use GNSS then this can be applied to share time resources of a frequency channel without coexistence problems with LTE-V2V.

Another approach is to use sensing-based vacate/switching. This co-existence approach assumes that a RAT can detect sharing of the same frequency channel by other RATs. Two general principles of operation are possible: technology-agnostic or technology-dependent detection. In the technology-agnostic approach, the vUE may avoid detection of the RAT type—instead the vUE may simply determine the presence of another RAT. In the technology-dependent approach, each technology is expected to be able to identify the type of another RAT sharing the channel. This can be done by analysis of the RAT specific physical layer signals. In some cases, detection of technology type may be impossible for future technologies given that their physical structure is not yet determined. This is to say that the technology-dependent approach may not be forward compatible.

However, technology-dependent RAT detection may be flexible enough to enable specific coexistence behavior depending on the type of detected RAT. The LTE V2V technology of various embodiments may detect any other existing ITS technology (e.g., DSRC) with processing of the reference signals used by the other ITS technology (e.g., a DSRC preamble). For example, the DSRC preamble has a predefined structure that can be used as a DSRC-specific signature and detected using auto- or cross-correlation approaches. To accomplish this, the LTE-V2V receiver behavior may be modified, for example, in terms of the automatic gain control (AGC) operation which may be updated not only at the time-aligned subframe boundaries of the LTE system but at the arbitrary time instance intervals when transmission of DSRC technology is triggered.

As above however, existing technologies may not be able to detect future RATs due to a causality problem—for example only LTE-V2V technology may be able to detect DSRC technology, unless additional specification work and functionality is integrated. Assuming that an older technology (e.g. DSRC) may not be able to detect the presence of a LTE-V2V RAT, the LTE-V2V technology may be unable to utilize the capability to recognize the presence of older technology type and adjust its own radio-layer behavior to extract mutual benefits for both technologies. Thus, a solution that does not assume technology differentiation may be used instead.

Figure 7:
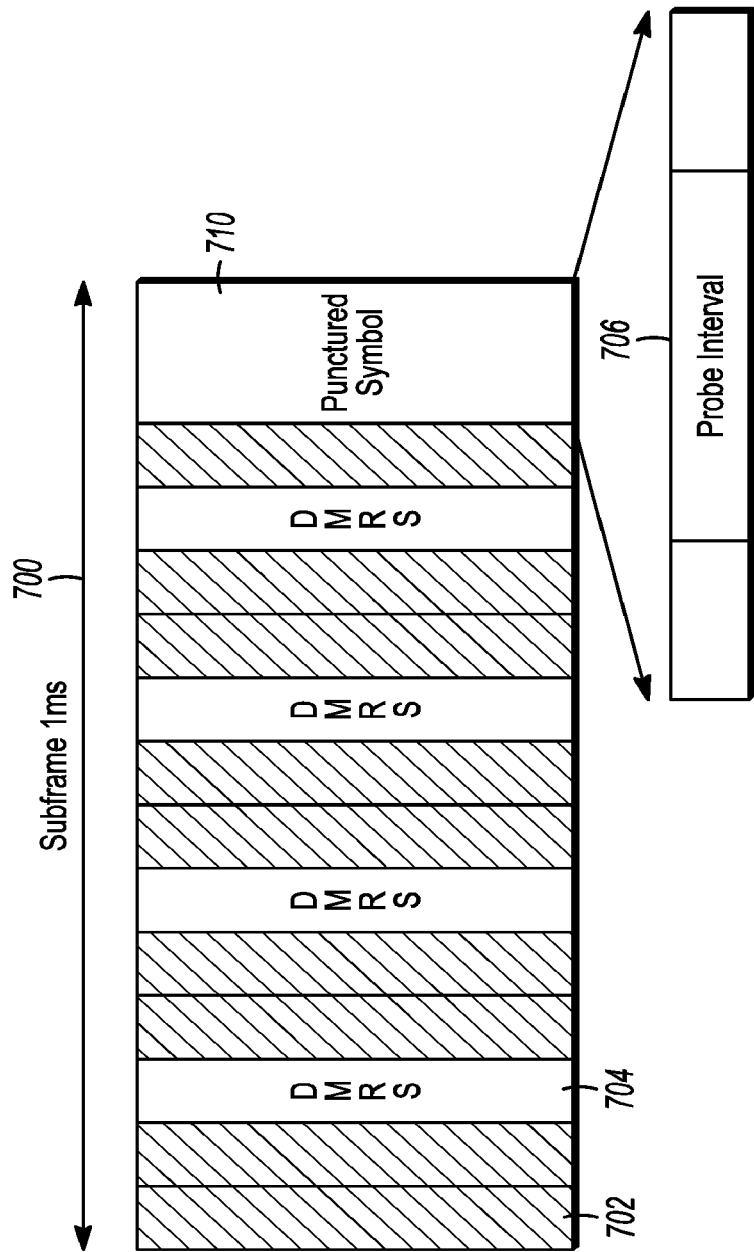
FIG. 7 illustrates a LTE-V2V subframe in accordance with some embodiments.

Due to these issues, in some cases, a technology-dependent RAT detection may be used. For example, the presence of another RAT may be detected by a vUE using an energy monitoring procedure performed in LTE V2V blank resources (i.e., predetermined resources in which no LTE transmissions are scheduled/intentionally left blank) such as resource elements reserved for ZP reference signals. The blank resources may be disposed in periodic subframes; in some embodiments, the subframes may be blank. FIG. 7 illustrates a LTE-V2V subframe in accordance with some embodiments. The subframe 700 may be used by any of the devices shown in FIGS. 1-6. The subframe 700 may be 1 ms in length, although this may vary in 5G systems. The subframe 700 may contain multiple symbols 702, which in the LTE system may be 14 symbols 702. One of more of the symbols 702 may contain reference signals, such as demodulation reference signals (DMRS) 704 shown in FIG. 7.

In one example, the energy measurement may occur at the last symbol 710 of the subframe 700. In this case, the LTE-V2V physical structure may assume puncturing of the last symbol 710 of each subframe 700. Thus, each vUE having a common timing notion may not transmit for the whole symbol duration at the end of each subframe. This time interval (shown as probe interval 706) could be used by LTE-V2V devices to measure received power and to detect the presence of another (e.g., DSRC) technology.

Figure 8:
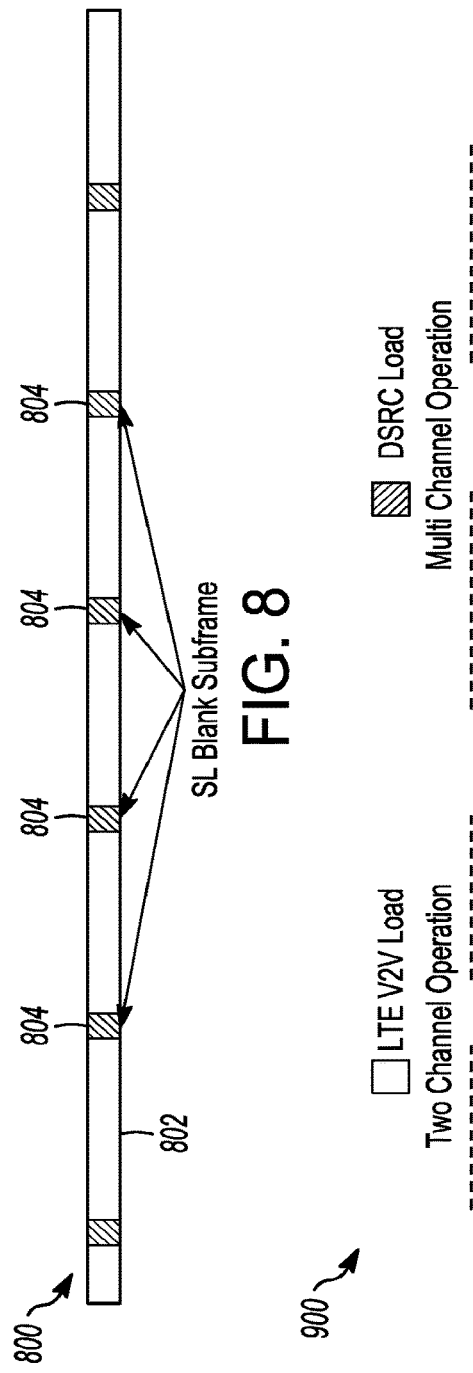
FIG. 8 illustrates LTE-V2V subframes in accordance with embodiments.

In some embodiments, the energy measurement may occur at specific subframes, rather than in each subframe. FIG. 8 illustrates LTE-V2V subframes in accordance with some embodiments. The subframes 800 may be used by any of the devices shown in FIGS. 1-6 and may have a similar structure as the subframe shown in FIG. 7. The subframes 800 may include different sets of LTE-V2V subframes 802, 804, at least some of which may contain non-V2V resources including subframes and/or sub-channels. Energy measurement may occur in the non-V2V resources. The V2V resource pool configuration may be flexible. Thus, some of the subframes 804 (or resource elements or symbols in the specific subframes) may be intentionally left as blank subframes, so that the vUEs do not transmit on those resources. Although the blank subframes may be configured by the eNB, the blank subframes may occur, for example, every 100 subframes or several hundred subframes. One or more blank subframes may occur at each blank subframe location. The measurement of received power in these blank resources can be used as an indication of another technology presence. Independent of when the energy measurement occurs, the timing may be provided to the vUE via higher layer (e.g., RRC) signaling or an information block, for example. In some embodiments, the vUE may take action (e.g., switching to a different frequency) immediately after a measurement of a blank subframe position finds use by a different RAT, thereby effecting a solution to a short-term issue. In some embodiments, the vUE may take action only after a measurement of a predetermined number of blank subframe positions (2 or more) finds use by a different RAT, thereby effecting a solution to a long-term issue.

In some cases, older RAT radio layer behavior may be changed depending on the presence of a LTE-V2V RAT or in order to simplify coexistence with future ITS communication technologies. In this case, RAT detection may use transmission of an additional LTE-V2V signature signal. In general, the detection of the LTE-V2V RAT can be done by detecting a LTE V2V sidelink synchronization signal (SLSS) transmission. However, the SLSS transmission periodicity may be relatively long (>160 ms) compared with that of other LTE signals, leading to an increased amount of time spend on detection of the SLSS. In addition, detection of LTE V2V SLSS signals may provide minimal information on the intensity of the LTE V2V transmissions.

To this end, the LTE-V2V specific signal (LTE-V2V signature) can be added at the last symbol of physical sidelink control/shared channel (PSCCH/PSSCH) subframes so that all vUEs transmitting in a given subframe add the LTE-V2V signature signal at the last (punctured) symbol of the subframe 804. This signal may occupy only a part of the legacy symbol duration (e.g. ½ of legacy symbol duration), as shown in FIG. 7, and transmitted by all vUEs at the same set of physical resources.

In some embodiments, the determination of the RAT co-existence may be followed by frequency channel switching. When the information about the RAT presence is available, the vUEs using the LTE-V2V RAT may perform frequency channel selection or switching. Depending on the frequency channel allocation, frequency channel selection may be performed in different ways.

In some embodiments, a single frequency channel may be allocated to LTE-V2V and DSRC communications. A co-existence solution for fair sharing of resources in this case may use implementation of a listen-before-talk (LBT) like solution. While such a procedure may be similar to an IEEE 802.11, it may be inconsistent with legacy LTE-V2V sensing and resource selection procedure.

Figure 9:
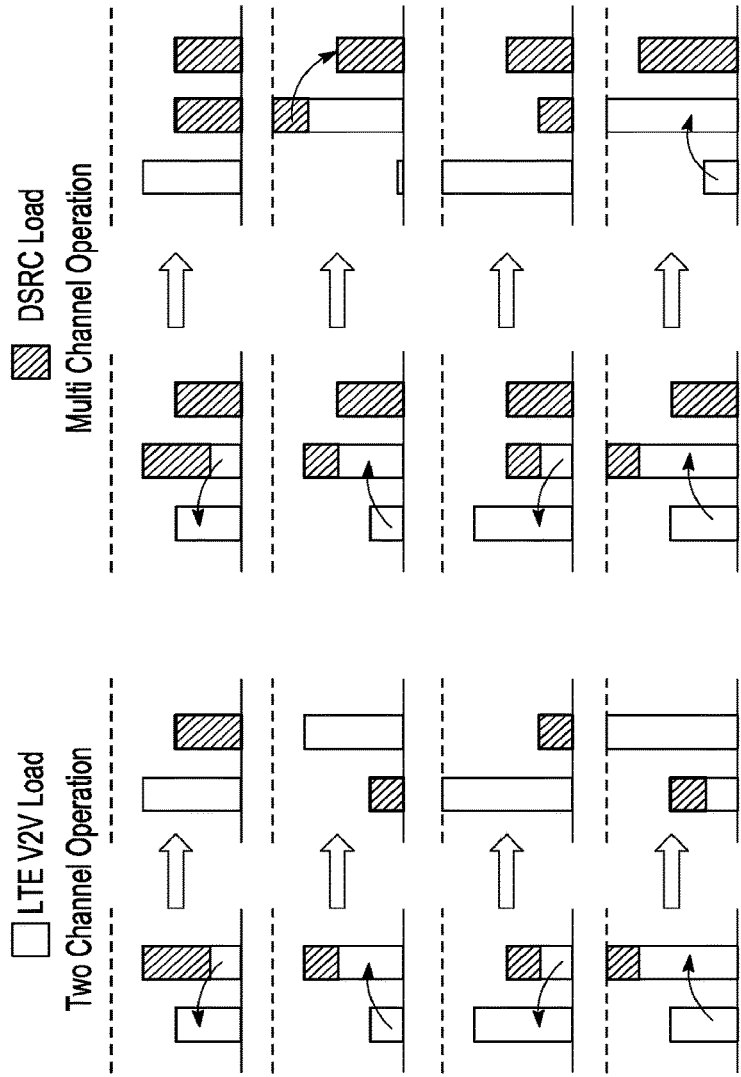
FIG. 9 illustrates channel switching in accordance with some embodiments.

In some embodiments, multiple frequency channels may be allocated to LTE-V2V and DSRC communications. In this case, multiple channels may be allocated for all technologies with equal priority or different priorities may be used. When the channels are allocated with equal priority, both RAT specific channel loading and overall channel loading may be taken into account when switching the channel. FIG. 9 illustrates channel switching in accordance with some embodiments. The channel switching scenarios 900 shown may be performed by any of the vUEs in FIGS. 1-6.

RAT specific channel loading—LRAT (e.g., LLTE-V2V, LDSRC) may be technology specific in the sense that each technology can measure channel loading produced by the technology according to a technology-specific metric (which may differ between the different technologies). For LTE-V2V, there are several approaches to define this metric, such as reference signal received power (RSRP) measurements over a PSSCH demodulation reference signal (DMRS) (or RSRQ), the amount of decoded sidelink control information (SCI) within a predefined time interval, and/or the number of resources occupied by vUEs within a predefined time interval, among others. In some cases, for channel activity indication the amount of decoded SCIs or amount of active vUEs (transmitters) may be suitable. A RSRP threshold may further be applied when the amount of decoded SCIs or active transmitters is evaluated.

Overall channel loading by multiple RATs—LCH may instead or in addition be used as a metric. This metric may be RAT-independent and characterize the channel loading occupation by multiple RATs. In some embodiments, the sidelink received signal strength indicator (SL-RSSI) measurement across the whole system bandwidth can be used to characterize the overall channel loading. The metric may measure the channel busy ratio evaluated over the predefined time interval on a predetermined set of resources.

Assuming that multiple channels can be used by both technologies with the same level of access priority, in some embodiments LTE-V2V transmissions may be concentrated in the channel in which LTE-V2V transmissions are dominant. This may assume that both channels experience a similar loading level. Examples of a similar loading level may be limited to general aspects of the channels, i.e., both channels are not overloaded or both are overloaded, or may be more specific, e.g., the channels are loaded within a predetermined amount or percent of maximum loading. If a significant overall channel loading difference among frequency channels is observed, for example one frequency channel is overloaded and another is not overloaded, the non-overloaded channel with highest RAT loading may be used and the overloaded channel(s) unused.

In situations in which there are more than two channels, the LTE-V2V UE may preferentially select the non-overloaded channel with higher LLTE-V2V loading (i.e., dominant presence of LTE-V2V transmissions). This is shown in the channel selection scenarios 900 shown in FIG. 9, in which in each case (whether two channels or more channels are used), the LTE-V2V UE selects a target non-overloaded channel with higher LTE-V2V loading as long as the channel is not overloaded. In some embodiments, the channel with the highest LTE-V2V loading is selected. In some cases, as shown by the multichannel operation scenarios, this selection may trigger a secondary selection of the other vUEs (shown as DSRC) from the target channel to a third channel to avoid overloading the channel with the total amount of LLTE-V2V and DSRC communications.

Figure 10:
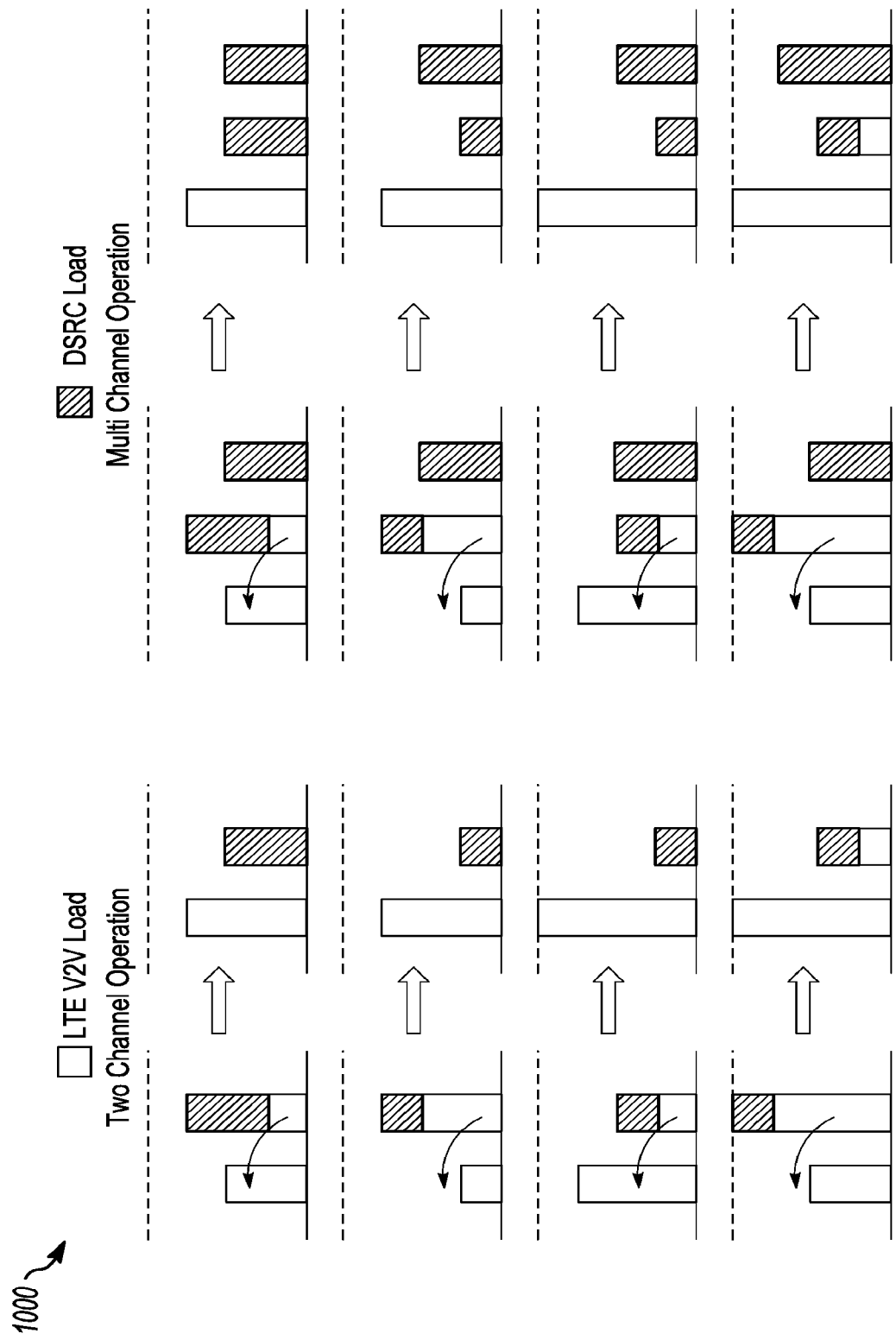
FIG. 10 illustrates channel switching in accordance with some embodiments.

As above, in some embodiments, multiple frequency channels may be allocated to LTE-V2V and DSRC communications with RAT-specific priorities. This is shown in FIG. 10, which illustrates channel switching in accordance with some embodiments. The channel switching scenarios 1000 shown may be performed by any of the vUEs in FIGS. 1-6.

In this case, each ITS channel may be assigned with a technology-specific priority. Thus, the vUE channel selection behavior may be different. In particular, the higher priority may be given to the channel associated with a higher priority for a given technology (primary channel), even if the overall loading in the lower priority channel (secondary channel) is much lower. This is shown, for example, in the lower two channel operation scenarios of FIG. 10. As above, this assumes that unless the loading in a higher priority channel is larger than the predefined level for the LTE RAT, the vUE may continue use the target channel; otherwise the vUE can switch to a channel with a lower priority. If multiple channels have equal RAT specific priority, the procedure described in relation to FIG. 9 may be used.

In general, specific V2X services can have different channel assignments in terms of channel priority. For example, primary and secondary channels may be defined per service rather than per RAT. While service-specific priority assignment may complicate the coexistence behavior, use of a service-specific priority assignment can be a useful technique from the intra-RAT channel loading perspective, assuming that a single technology can occupy multiple channels.

Channel selection may he used for intra LTE-V2V congestion control. V2X services can be assigned multiple frequency channels for V2V communication. Some embodiments may assume that each V2V service may have its own primary channel for V2V communication. In other words, there can be some indication at upper layers on service-specific priority to utilize the particular channel for a given service delivery. For instance, the primary and secondary channels can be assigned to each V2V service type. Alternatively, the service-specific channel priority levels can be assigned. In any of these scenarios, the vUE can measure the channel loading by utilizing a congestion metric and select the appropriate frequency channel for communication. If service-specific priorities are assigned to each channel, the vUE may prioritize the channel that has higher priority for a given service delivery unless the channel is overloaded or congested at the radio layer. If the channel is overloaded, the vUE may select a non-overloaded channel that has the highest priority for the given V2V service to be delivered.

If multiple channels have equal priority for each V2V service, different congestion control techniques may be used. In some embodiments, a channel load balancing technique may be used in which the less congested channel is selected. This may not depend on the V2V service distribution across channels and may reduce congestion at each channel. Alternatively, in some embodiments, a channel may be selected where a given V2V service has dominant presence. In this case, the selection may be independent of the channel loading, so long as the channel is not overloaded.

Congestion control may also be managed by the vUE via the adjustment of transmit parameters. In a single frequency channel scenario, channel selection congestion control may be unable to be applied. In this case the radio-layer transmit parameters may be adjusted based on congestion control metric. Various parameters may be controlled to provide coarse granularity for congestion control, including the maximum number of transmission time intervals (TTIs) (retransmissions) used per transport block (TB), the maximum number of sub-channels that can be utilized per TB transmission, the range of effective code rates per TB transmission, and the minimum inter-TB transmission interval.

The various settings or limits may be a function of PC5 congestion control metrics measured by the vUE. This may permit the eNB or upper layers to provide the settings to be used for sidelink V2V transmissions. The parameters may be defined per resource pool and for each TX priority level.

In some cases, the metrics may provide course congestion control. For one example, it may take several times to reduce the system load if the inter-TB transmission interval is controlled. In some circumstances however, it may be desirable to control loading with finer granularity. For instance, the system may drop one of N subsequent TBs or drop M of N subsequent TBs subject to the minimum distance Dmin between dropped packets. In this case, each vUE can randomly select one of the transmission patterns that satisfy the Dmin condition on inter-TB transmission. This approach can be also implemented in a probabilistic way by configuring the drop probability Pdrop and ensuring that at least Dmin TBs are transmitted before the next upcoming TB can be dropped.

For V2V communication, the vUE may monitor a sensing window of one second duration. For resource (re)selection, the vUE may measure the total received power measurements on sidelink resources (S-RSSI) (resources allocated by the eNB for sidelink communications) and/or the UE-specific measurement over PSSCH channel transmissions conducted over DMRS signals (PSSCH-RSRP). Either or both measurement types may be used as a congestion metric. As the LTE PC5 V2V communication assumes time and frequency division multiplexing within a subframe, the S-RSSI measurement may be time and frequency selective. The congestion metric measurements granularity may be aligned with signal transmission granularity, and hence may not be less than one subframe in time and one frequency sub-channel in frequency. The congestion metric measurement can be conducted over the PSSCH resources only, or separately over PSCCH and PSSCH resources.

In some embodiments, during the sensing procedure the S-RSSI measurements may be conducted by the vUE for each subframe that is allocated for PSSCH transmission. Thus, the number of probes can, in general, be equal to the number of time frequency resources within the sensing window. However, geo-location based transmission techniques may also factor in, and thus it may be also desirable to perform channel probing over preconfigured subsets of resources (or pools). This may permit the eNB to indicate which resources are used to perform S-RSSI measurements for estimation of channel load. The measurements can be reported to network in order for the network (e.g., eNB) to control the sidelink operation settings.

Figure 11:
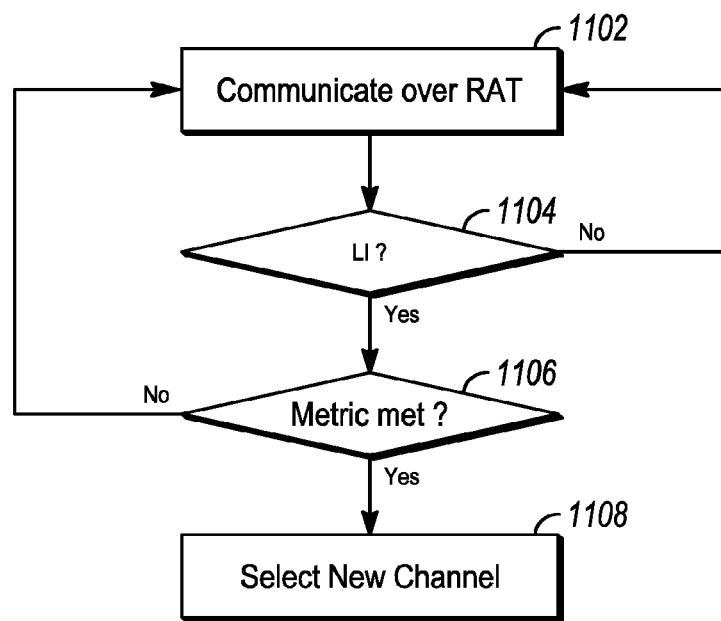
FIG. 11 illustrates a method of providing V2V communications in accordance with some embodiments.

FIG. 11 illustrates a method of providing V2V communications in accordance with some embodiments. The method may be performed by the vUEs shown in any of FIGS. 1-6. In some embodiments, the method may be performed by the means described above. In some embodiments, the method to provide V2V communications may contain other operations not shown in FIG. 11.

At operation 1102, the vUE may communicate over one or more RATs. The RAT(s) may include, for example, LTE and/or DSRC.

At operation 1104, the vUE may determine whether a listening interval to sense for a V2V signal has occurred. The listening interval may occur, for example, in the unoccupied last symbol in each V2V subframe or in a separate predefined set of subframes. The V2V signal may be used to detect the LTE V2V transmitters that operate at the same frequency.

At operation 1106, when the vUE determines that the listening interval has been reached, the vUE may determine whether a particular metric has been reached. The metrics may be used to measure channel loading on one or more channels.

At operation 1108, when the vUE determines that the metric has been met, the vUE may select or switch to another frequency channel to provide co-existence with other. The vUE may transmit an indication to the eNB regarding the reselection.

EXAMPLES

Example 1 is an apparatus of a vehicle user equipment (vUE), the apparatus comprising: an interface to send communications to and receive communications from at least one of an evolved NodeB (eNB) or another vUE; and processing circuitry in communication with the interface and arranged to: determine, in a channel of a sidelink subframe used in communication between vUEs, that a predetermined listening interval has been reached, the channel allocated to a long term evolution (LTE) vehicle-to-vehicle (V2V) radio access technology (RAT), the predetermined listening interval configured to be devoid of LTE radio frequency (RF) signals; detect at least one of a V2V or non-V2V signal in the channel during the predetermined listening interval; determine that a non-LTE RAT is in operation in the channel based on detection of the at least one of the V2V or non-V2V signal in the channel during the predetermined listening interval; and determine whether to one of drop packet transmission or select another channel for transmission. of multiple channels allocated to the LTE-V2V RAT and the non-LTE RAT, in response to a determination that the non-LTE RAT is in operation in the channel, the selection based on allocation priorities of the multiple channels for the LTE-V2V RAT and the non-LTE RAT and conducted measurements in a given channel.

In Example 2, the subject matter of Example 1 includes, wherein: the detection comprises detection of energy of the at least one of the V2V or non-V2V signal, and the predetermined listening interval is disposed in a last symbol of each of a plurality of contiguous sidelink subframes allocated for cellular V2V communication.

In Example 3, the subject matter of Example 2 includes, wherein: the last symbol is punctured and the predetermined listening interval is disposed within a punctured region of the last symbol.

In Example 4, the subject matter of Examples 1-3 includes, wherein: the detection comprises detection of energy of the V2V signal, and the predetermined listening interval is disposed in V2V blank reserved resources disposed in preconfigured sidelink subframes.

In Example 5, the subject matter of Examples 1-4 includes, wherein: the V2V signal is a LTE-V2V specific signal transmitted by other vUEs in a last symbol of at least one of a physical sidelink control channel (PSCCH) or physical sidelink shared channel (PSSCH).

In Example 6, the subject matter of Example 5 includes, wherein: the last symbol is punctured and the signal occupies a part of a last symbol duration.

In Example 7, the subject matter of Examples 1-6 includes, wherein: the LTE-V2V RAT and the non-LTE RAT are allocated with equal priority.

In Example 8, the subject matter of Example 7 includes, wherein: a determination of whether to drop packet transmission in the given channel or select another channel for transmission is dependent on at least one of RAT-specific channel loading or overall channel loading of each of the multiple channels.

In Example 9, the subject matter of Example 8 includes, wherein: the determination of whether drop packet transmission in the given channel or select another channel for transmission, as well as which other channel to select, is dependent on RAT-specific channel loading, and the RAT-specific channel loading is determined by at least one of reference signal received power (RSRP) measurements over a physical sidelink control (PSCCH) or shared channel (PSSCH) demodulation reference signal (DMRS) and comparison with a pre-configured RSRP threshold, an amount of decoded sidelink control information (SCI) within a predefined time interval, or at least one of a number or ratio of resources detected as occupied by vUEs within the predefined time interval.

In Example 10, the subject matter of Examples 8-9 includes, wherein: the determination of whether drop packet transmission in the given channel or select another channel for transmission, as well as which other channel to select, is dependent on overall channel loading, and the overall channel loading is determined by a sidelink received signal strength indicator (SL-RSSI) across at least one of an entire system bandwidth or frequency sub-channels configured for sidelink V2V communication, and comparison with pre-configured RSSI threshold.

In Example 11, the subject matter of Examples 8-10 includes, wherein the processing circuitry is further arranged to: select to a non-overloaded channel that has at least one of a highest LTE-V2V RAT priority or delivered V2V service specific priority among the multiple channels.

In Example 12, the subject matter of Examples 1-11 includes, wherein: the LTE-V2V RAT and the non-LTE RAT are allocated with priorities dependent on a type of RAT or vehicle-to-everything (V2X) service type.

In Example 13, the subject matter of Example 12 includes, wherein the processing circuitry is further arranged to: select to a non-overloaded channel that has a highest priority for a particular RAT or V2X service type among the multiple channels unless the selection causes the non-overloaded channel to be overloaded.

In Example 14, the subject matter of Examples 12-13 includes, wherein the processing circuitry is further arranged to: select to a non-overloaded channel, among the multiple channels, that is dependent on a vehicle-to-anything (V2X) or V2V service provided by the LTE-V2V RAT.

In Example 15, the subject matter of Example 14 includes, wherein: the non-overloaded channel is a less congested channel when a plurality of the channels have equal priority for the V2X or V2V service.

In Example 16, the subject matter of Examples 14-15 includes, wherein the reselection further comprises: the non-overloaded channel is a channel in which the V2X or V2V service is dominant independent of channel congestion unless the selection causes the non-overloaded channel to be overloaded.

In Example 17, the subject matter of Examples 1-16 includes, wherein the processing circuitry is further arranged to: select to a non-overloaded channel and control at least one congestion control transmission parameter for sidelink V2V transmissions, the at least one metric comprising at least one of a maximum number of transmission time intervals (TTIs) used per transport block (TB), a maximum number of sub-channels able to be used per TB transmission, a range of effective code rates per TB transmission, or a minimum inter-TB transmission interval.

In Example 18, the subject matter of Examples 1-17 includes, wherein the processing circuitry is further arranged to: select to a non-overloaded channel dependent on total received power measurements on sidelink resources.

In Example 19, the subject matter of Example 18 includes, wherein the processing circuitry is further arranged to: measure the total received power measurements on sidelink resources comprises one of physical sidelink shared channel (PSSCH) resources free from a measurement on physical sidelink control channel (PSCCH) resources or both PSSCH and PSCCH resources.

In Example 20, the subject matter of Example 19 includes, wherein: a measurement of the total received power measurements on the PSSCH resources occurs over preconfigured subsets of available PSSCH resources.

In Example 21, the subject matter of Examples 1-20 includes, wherein: the processing circuitry comprises a baseband processor configured to encode transmissions to, and decode transmissions from, the eNB or other vUE.

Example 22 is an apparatus of an evolved NodeB (eNB), the apparatus comprising: an interface to send communications to and receive communications from a vehicle user equipment (vUE); and processing circuitry in communication with the interface and arranged to: encode, for transmission to the vUE, an indication of a predetermined listening interval, the listening interval disposed in at least one of a physical sidelink control channel (PSCCH) or physical sidelink shared channel (PSSCH) and devoid of long term evolution (LTE) radio frequency (RF) signals between the vUE and the eNB; allocate multiple channels to a LTE vehicle-to-vehicle (V2V) radio access technology (RAT), the multiple channels simultaneously allocated to a non-LTE RAT; and encode, for transmission to the vUE, an indication at least one metric for measurement of sidelink V2V transmissions for one of dropping by the vUE of to packet transmission or selection by the vUE from one of the multiple channels to another of the multiple channels in response to the metric being reached.

In Example 23, the subject matter of Example 22 includes, wherein: the predetermined listening interval is disposed in a last symbol of each sidelink subframe, during which a LTE-V2V specific signal transmitted by other vUEs occupies a punctured part of a last symbol duration.

In Example 24, the subject matter of Examples 22-23 includes, wherein: the LTE-V2V RAT and the non-LTE RAT are allocated with equal priority, the processing circuitry is further arranged to encode for transmission to the vUE an indication of whether to select dependent on at least one of RAT-specific channel loading or overall channel loading of each of the multiple channels, selection dependent on RAT-specific channel loading is determined by at least one of reference signal received power (RSRP) measurements over a PSSCH demodulation reference signal (DMRS) and comparison with pre-configured RSRP threshold, an amount of decoded sidelink control information (SCI) within a predefined time interval, or a number of resources occupied by vUEs within the predefined time interval, and selection dependent on overall channel loading is determined by a sidelink received signal strength indicator (SL-RSSI) across one of an entire system bandwidth or pre-configured sub-channel and comparison with pre-configured RSSI threshold.

In Example 25, the subject matter of Examples 22-24 includes, wherein: the LTE-V2V RAT and the non-LTE RAT are allocated with priorities dependent on a type of RAT, and the processing circuitry is further arranged to encode for transmission to the vUE an indication to select to a non-overloaded channel that has a highest priority for a particular RAT among the multiple channels or that is dependent on a vehicle-to-anything (V2X) or V2V service provided by the LTE-V2V RAT.

In Example 26, the subject matter of Examples 22-25 includes, wherein: the at least one metric is a congestion control transmission parameter that comprises at least one of a maximum number of transmission time intervals (TTIs) used per transport block (TB), a maximum number of sub-channels that to used per TB transmission, a range of effective code rates per TB transmission, or a minimum inter-TB transmission interval.

In Example 27, the subject matter of Examples 22-26 includes, wherein: the processing circuitry is further arranged to encode for transmission to the vUE an indication to select to a non-overloaded channel dependent on total received power measurements on PSSCH resources free from a measurement on PSCCH resources.

Example 28 is a computer-readable storage medium that stores instructions for execution by one or more processors of a vehicle user equipment (vUE), the one or more processors to configure the vUE to: detect, in a channel allocated to a long term evolution (LTE) vehicle-to-vehicle (V2V) radio access technology (RAT) and to a non-LTE RAT, non-LTE RF signals in a punctured region of a last symbol of a physical sidelink control channel (PSCCH) or physical sidelink shared channel (PSSCH) that is configured by the eNB to be devoid of LTE radio frequency (RF) signals; and select to a non-overloaded channel to communicate with at least one of another vUE or the eNB dependent on at least one metric for sidelink V2V transmissions.

In Example 29, the subject matter of Example 28 includes, wherein: the LTE-V2V RAT and the non-LTE RAT are allocated with equal priority among multiple channels, whether to drop transmission or which non-overloaded channel to select is dependent on at least one of RAT-specific channel loading or overall channel loading of each of the multiple channels, whether to drop transmission or which non-overloaded channel to select is dependent on RAT-specific channel loading is determined by at least one of reference signal received power (RSRP) measurements over a PSCCH or PSSCH demodulation reference signal (DMRS), an amount of decoded sidelink control information (SCI) within a predefined time interval, or a number of resources occupied by vUEs within the predefined time interval, and selection dependent on overall channel loading is determined by a sidelink received signal strength indicator (SL-RSSI) across one of an entire system bandwidth or within pre-configured sub-channels.

In Example 30, the subject matter of Examples 28-29 includes, wherein at least one of: the LTE-V2V RAT and the non-LTE RAT are allocated with priorities dependent on a type of RAT, the at least one metric is a congestion control parameter that comprises at least one of a maximum number of transmission time intervals (TTIs) used per transport block (TB), a maximum number of sub-channels that used per TB transmission, a range of effective code rates per TB transmission, or a minimum inter-TB transmission interval, selection is to a non-overloaded channel that has a highest priority for a particular RAT among the multiple channels or that is dependent on a vehicle-to-anything (V2X) or V2V service provided by the LTE-V2V RAT, or selection is to a non-overloaded channel that is dependent on total received power measurements on sidelink resources or PSSCH resources free from a measurement on PSCCH resources.

Example 31 is a method of vehicle-to-vehicle (V2V) communication of a vehicle user equipment (vUE), the method comprising: detecting, in a channel allocated to a long term evolution (LTE) V2V radio access technology (RAT) and to a non-LTE RAT, non-LTE RF signals in a punctured region of a last symbol of a physical sidelink control channel (PSCCH) or physical sidelink shared channel (PSSCH) that is configured by the eNB to be devoid of LTE radio frequency (RF) signals; and selecting to a non-overloaded channel to communicate with at least one of another vUE or the eNB dependent on at least one metric for sidelink V2V transmissions.

In Example 32, the subject matter of Example 31 includes, wherein: the LTE-V2V RAT and the non-LTE RAT are allocated with equal priority among multiple channels, whether to drop transmission or which non-overloaded channel to select is dependent on at least one of RAT-specific channel loading or overall channel loading of each of the multiple channels, whether to drop transmission or which non-overloaded channel to select is dependent on RAT-specific channel loading is determined by at least one of reference signal received power (RSRP) measurements over a PSCCH or PSSCH demodulation reference signal (DMRS), an amount of decoded sidelink to control information (SCI) within a predefined time interval, or a number of resources occupied by vUEs within the predefined time interval, and selection dependent on overall channel loading is determined by a sidelink received signal strength indicator (SL-RSSI) across one of an entire system bandwidth or within pre-configured sub-channels.

In Example 33, the subject matter of Examples 31-32 includes, wherein at least one of: the LTE-V2V RAT and the non-LTE RAT are allocated with priorities dependent on a type of RAT, the at least one metric is a congestion control parameter that comprises at least one of a maximum number of transmission time intervals (TTIs) used per transport block (TB), a maximum number of sub-channels that used per TB transmission, a range of effective code rates per TB transmission, or a minimum inter-TB transmission interval, selection is to a non-overloaded channel that has a highest priority for a particular RAT among the multiple channels or that is dependent on a vehicle-to-anything (V2X) or V2V service provided by the LTE-V2V RAT, or selection is to a non-overloaded channel that is dependent on total received power measurements on sidelink resources or PSSCH resources free from a measurement on PSCCH resources.

Example 34 is an apparatus of a vehicle user equipment (vUE), the apparatus comprising: means for detecting, in a channel allocated to a long term evolution (LTE) vehicle-to-vehicle (V2V) radio access technology (RAT) and to a non-LTE RAT, non-LTE RF signals in a punctured region of a last symbol of a physical sidelink control channel (PSCCH) or physical sidelink shared channel (PSSCH) that is configured by the eNB to be devoid of LTE radio frequency (RF) signals; and means for selecting to a non-overloaded channel to communicate with at least one of another vUE or the eNB dependent on at least one metric for sidelink V2V transmissions.

In Example 35, the subject matter of Example 34 includes, wherein: the LTE-V2V RAT and the non-LTE RAT are allocated with equal priority among multiple channels, whether to drop transmission or which non-overloaded channel to select is dependent on at least one of RAT-specific channel loading or overall channel loading of each of the multiple channels, whether to drop transmission or which non-overloaded channel to select is dependent on RAT-specific channel loading is determined by at least one of reference signal received power (RSRP) measurements over a PSCCH or PSSCH demodulation reference signal (DMRS), an amount of decoded sidelink control information (SCI) within a predefined time interval, or a number of resources occupied by vUEs within the predefined time interval, and selection dependent on overall channel loading is determined by a sidelink received signal strength indicator (SL-RSSI) across one of an entire system bandwidth or within pre-configured sub-channels.

In Example 36, the subject matter of Examples 34-35 includes, wherein at least one of: the LTE-V2V RAT and the non-LTE RAT are allocated with priorities dependent on a type of RAT, the at least one metric is a congestion control parameter that comprises at least one of a maximum number of transmission time intervals (TTIs) used per transport block (TB), a maximum number of sub-channels that used per TB transmission, a range of effective code rates per TB transmission, or a minimum inter-TB transmission interval, selection is to a non-overloaded channel that has a highest priority for a particular RAT among the multiple channels or that is dependent on a vehicle-to-anything (V2X) or V2V service provided by the LTE-V2V RAT, or selection is to a non-overloaded channel that is dependent on total received power measurements on sidelink resources or PSSCH resources free from a measurement on PSCCH resources.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for a base station to allocate at least one sub-channel for device-to-device (D2D) communication, comprising:
    transmitting, to a user equipment device (UE), an indication of the at least one sub-channel and resource pools the UE uses for communication with other UEs and not for transmissions to the base station, wherein the resource pools are disposed in a physical sidelink channel; and transmitting, to the UE, an indication of at least one metric for measurement of D2D transmissions for adjustment of transmission parameters on the at least one allocated sub-channel and the resource pools.

2. The method of claim 1, further comprising:
allocating the at least one sub-channel to D2D communication.

3. The method of claim 1, wherein said transmitting, to the UE, the indication of the at least one metric for measurement of D2D transmissions for adjustment of transmission parameters is in response to measurement of the at least one metric by the UE.

4. The method of claim 1, further comprising:
providing transmission parameters to the UE for the D2D communication.

5. The method of claim 1, wherein the transmission parameters are defined per resource pool.

6. The method of claim 1,
wherein the transmission parameters are defined per transmission priority level.

7. The method of claim 1,
wherein the physical sidelink channel comprises at least one of a physical sidelink control channel (PSCCH) or a physical sidelink shared channel (PSSCH).

8. A base station, comprising:
an interface configured for wireless communication; and
a processor in communication with the interface and configured to cause the base station to:
transmit, to a user equipment device (UE), an indication of at least one sub-channel and resource pools the UE uses for communication with other UEs and not for transmissions to the base station, wherein the resource pools are disposed in a physical sidelink channel; and
transmit, to the UE, an indication of at least one metric for measurement of D2D transmissions for adjustment of transmission parameters on the at least one sub-channel and the resource pools.

9. The base station of claim 8,
wherein the processor is further configured to cause the base station to:
allocate the at least one sub-channel to D2D communication.

10. The base station of claim 8,
wherein the processor is further configured to transmit, to the UE, the indication of the at least one metric for measurement of D2D transmissions for adjustment of transmission parameters in response to measurement of the at least one metric by the UE.

11. The base station of claim 8,
wherein the processor is further configured to cause the base station to:
provide transmission parameters to the UE for the D2D communication.

12. The base station of claim 8,
wherein the transmission parameters are defined per resource pool.

13. The base station of claim 8,
wherein the transmission parameters are defined per transmission priority level.

14. The base station of claim 8,
wherein the physical sidelink channel comprises at least one of a physical sidelink control channel (PSCCH) or a physical sidelink shared channel (PSSCH).

15. An apparatus, comprising:
a memory; and
a processor in communication with the memory and configured to:
transmit, to a user equipment device (UE), an indication of at least one sub-channel and resource pools the UE uses for communication with other UEs and not for transmissions to a base station associated with the apparatus, wherein the resource pools are disposed in a physical sidelink channel; and
transmit, to the UE, an indication of at least one metric for measurement of D2D transmissions for adjustment of transmission parameters on the at least one sub-channel and the resource pools.

16. The apparatus of claim 15,
wherein the processor is further configured to:
allocate the at least one sub-channel to D2D communication.

17. The apparatus of claim 15,
wherein the processor is further configured to:
provide transmission parameters to the UE for the D2D communication.

18. The apparatus of claim 15,
wherein the transmission parameters are defined per resource pool.

19. The apparatus of claim 15,
wherein the transmission parameters are defined per transmission priority level.

20. The apparatus of claim 15,
wherein the physical sidelink channel comprises at least one of a physical sidelink control channel (PSCCH) or a physical sidelink shared channel (PSSCH).

* * * * *